July 2, 1929.  J. J. McGRATH  1,719,557
ELECTRIC SAW FOR CUTTING PLASTER CASTS
Filed Jan. 16, 1928
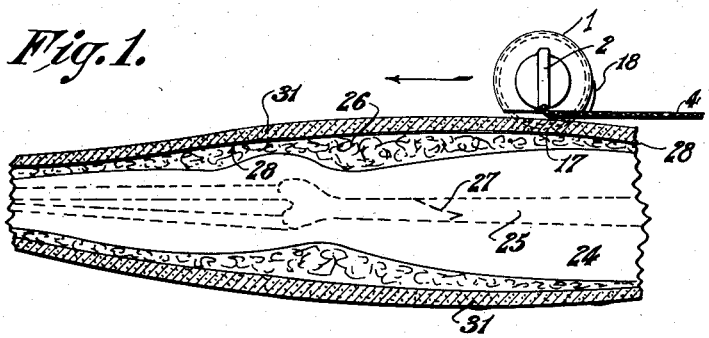
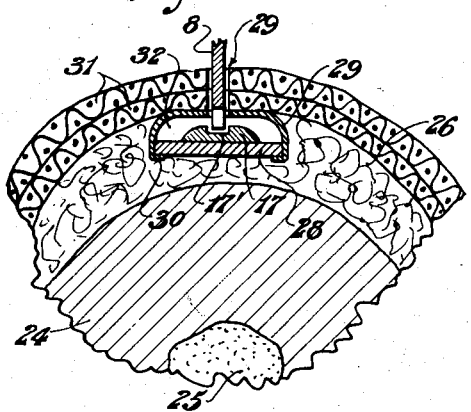
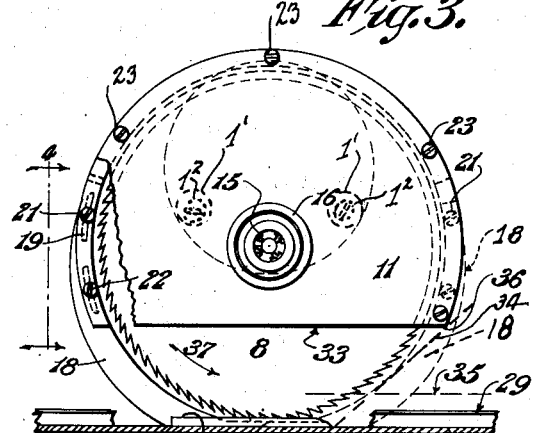
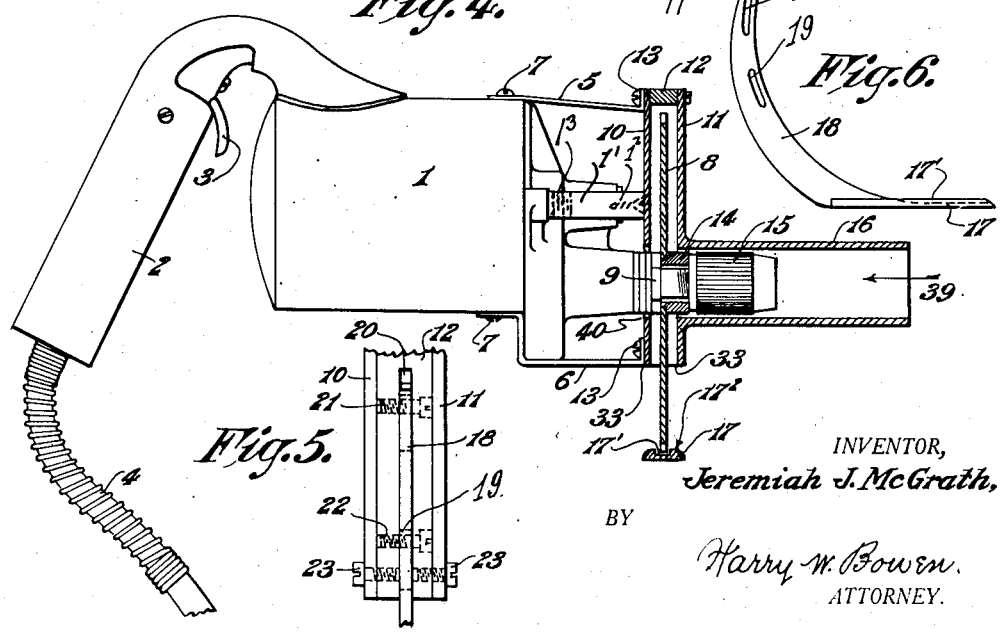
INVENTOR,
Jeremiah J. McGrath,
BY
Harry W. Bowen.
ATTORNEY.

Patented July 2, 1929.

1,719,557

UNITED STATES PATENT OFFICE.

JEREMIAH J. McGRATH, OF SPRINGFIELD, MASSACHUSETTS.

ELECTRIC SAW FOR CUTTING PLASTER CASTS.

Application filed January 16, 1928. Serial No. 247,221.

This invention relates to improvements in machines for removing a plaster cast. An object of the invention is to provide a structure that will readily cut through the gauze winding which composes the major part of the plaster cast proper of the bandage without any liability of coming into contact with the flesh of the person and injuring the patient. Heretofore a common or usual way of removing the cast is by means of a knife or similar implement by cutting through the several layers of gauze until the inner or absorbent cotton layer is reached. This is not only a slow process but often distresses the patient.

The invention broadly comprises a rotatable saw member which is attached to and operated by an electric motor. The saw is protected by a casing. The machine is provided with a shoe that extends from the casing downward and below the lower portion of the saw. This shoe is formed with a groove to receive the teeth of the saw. Located in the absorbent cotton portion of the plaster cast is a metallic plate on which this shoe travels when in use as will be described. Attached to this metallic plate is a thin metal arc-shaped member that is located in the absorbent winding of the bandage and below the inner layer of gauze winding. This metallic plate and the enclosing arc-shaped member is placed in the bandage when the plaster cast is made. In operation the saw cuts through the layers of gauze bandage composing the plaster cast and also through the thin metal arc-shaped member and the shoe travels along on the other metallic member which is located in the absorbent cotton, whereby the plaster cast is cut or slitted as the saw is moved along. Suitable means are provided for firmly holding the machine while being used. Means is also provided for ventilating the saw as it rotates by drawing in external air, whereby the plaster cast cuttings of the saw are removed or blown away. Further objects and nature of the invention will appear in the body of the specification, with reference to the drawings, and will be specifically pointed out in the appended claims.

Referring to the drawings:

Fig. 1 is a longitudinal sectional view indicating a plaster cast in place on a limb and illustrating how the machine is to be used.

Fig. 2 is a detailed sectional view on an enlarged scale illustrating a portion of the cast, also the metal plate on which the shoe of the machine travels and the thin arc-shaped metal casing portion that is attached to the metal plate.

Fig. 3 is a side elevational view of the machine partially broken away illustrating the adjustable shoe in place on the metallic plate on which it travels.

Fig. 4 is a side elevational view partially in section showing the enclosing casing for the saw, the tubular handle portion, and the manner of attaching the saw to the shaft of the motor.

Fig. 5 is a detail edge view of the manner of adjusting the shoe, and

Fig. 6 is a detail side view of the shoe removed from the saw enclosing casing.

Referring to the drawings in detail:

1 designates the casing of the electric motor. The type of motor employed is preferably that of an electric drill having the handle portion 2 and the trigger switch 3. 4 is the electric wire or cable which supplies current to the motor. Attached to the casing 1 of the motor are two braces 5 and 6 by means of the screws 7. 8 designates the saw which is attached to the shaft 9 of the motor. The saw is enclosed in a casing composed of the two plates 10 and 11. 12 is an arc-shaped spacing member between plates and to which they are secured. The braces 5 and 6 are connected to the casing plate 10 by the screws 13. 14 is a collar for securing the saw 8 on the motor shaft 9. The usual drill receiving nut is indicated at 15. 16 is a tubular handle portion that is suitably secured to the outer casing 7 as by brazing or it may be formed as an integral part of the plate 7. 17 designates a shoe member that is adjustably secured to the casing of the saw by means of the arm portion 18 which is formed with the two slots 19. The arm portion 18 of the shoe 17 is located in a slot 20 of the spacer plate 12 (see Fig. 5). This arm is retained in position by means of the screws 21 and 22 which enter threaded openings in the spacer plate 12. 23 are screws for attaching the plates 10 and 11 to the spacer plate 12. By removing the plate 11 and loosening the screws 21 and 22 the arm 18 may be removed or adjusted. The spacer plate is formed with slots on its opposite sides.

The limb of a patient is indicated at 24 and 25 indicates a bone in the limb. 26 is the cotton batting that is placed next to the limb. A break in the bone is indicated at 27. 28 indicates a metal plate, and attached to this metal plate is a casing or arc-shaped cover portion 29, of thin metal. By bending the same around the lower side of the plate 28 as indicated at 30 a casing element is formed. This plate 28 and the thin cover 29 are assembled on the cotton batting 26 before the plaster cast bandage is applied. A suitable length of the assembled casing plates is cut off to correspond with the length of the plaster cast to be made. This casing member is located or placed on the cotton batting 26; next, the layers of gauze 31, saturated with wet plaster of Paris are wrapped around the limb of the patient and directly over the casing plate 29 as shown in Fig. 2.

When it is desired to cut the gauze layers 31 of the cast, the machine is used as follows: It is to be understood that one end of the casing members 28 and 29 project slightly beyond the end of the cast permitting the shoe 17 to enter the opening 32. The operator now grasps the machine by means of the handle 2 and the tubular member 16. By pressing the trigger switch lever 3 the circuit is closed and the saw 8 is operated. The operator then slowly moves the shoe 17 along on the plate 28 which rotates in the groove 17' of the shoe. The saw cuts through the gauze windings 31 of the cast as it is moved forward by the operator. This causes the saw to cut through the fabric 31 and through the thin metal arc-shaped casing member 29, forming the slit 29'. After the entire length of the cast has been slit it may be readily opened as it permits the thin metal part 29 to free itself from the plate 28. The cotton batting 27 may now be readily removed from the limb.

It should be stated that the lower edges 33 of the casing plates 10 and 11 are so spaced from the top edge 17² of the shoe 17 that the teeth of the saw will not come into contact with any object when it is laid down as indicated by the dotted line 34. In the event that the bandage or cast is substantially ¼ of an inch thick, as indicated by the dotted line 35, the point 36 of the machine, will then if tipped, when moved forward, strike the cast at 35. The saw 8 will not enter the space between the end of the shoe and the point 36 as indicated by the line 34, and will prevent the saw from injuring the person.

In practice the saw rotates in the direction of the arrow 37 or in other words the cast 31 is cut from the bottom upwards as the machine is moved in the direction of the arrow 37', throwing the removed material upward. It is so used in the event that the cast is not thoroughly dry. If the cast is thoroughly dry the shoe 17 is placed on the other side of the casing as indicated by the dotted lines which shows the shoe supporting arm 17 in this position, (see Fig. 3). The saw will still rotate in the same direction and the teeth will point in the same direction. This will have the effect of cutting the bandage from the top down and throwing the dry plaster dust material under the cast. The tubular handle 16 serves the purpose of causing air to be drawn inward and enter as indicated by the arrow 39. The air will also enter the casing in which the saw is located by means of the opening in the plate 10 as shown at 40. The implement when in use may be readily stopped and started by operating the trigger switch 3 permitting the operator to carefully control the saw in removing the cast. One of the features of my machine is its lightness and permits the operator to use both hands by means of the handle 2 and the tubular part 16, whereby the cut through the cast may be carefully made. It will be seen from this description I have provided a very efficient machine for removing plaster casts, also the method of removing the same by locating a suitable metallic casing in the cotton batting of the cast, in order that the layers of the cast and the thin metal 29 of the casing may be readily cut. Often times the bandage or cast after being applied necessitates opening the same for the purpose of relieving pressure on the limb of the patient. After it is opened it may be drawn together again by the use of surgeon's tape.

It is to be understood that the machine is adapted for cutting plaster casts having any desired thickness up to 1¼ inches, and as thin as desired, due to the space between the edge 33 of the plates 10 and 11 and the upper edge 17² of the shoe 17.

1' designates posts for securing the plate 10 to the frame work of the motor by means of the screws 1² and threads 1³.

What I claim is:

1. A plaster cast bandage cutting machine comprising in combination with a motor driven saw, oppositely located plates for enclosing the upper part of the saw but leaving its lower portion uncovered, a grooved shoe for receiving the teeth of the saw, a spacer or plate located between the plates and to which the plates are secured, a plate located within the cotton batting part of the bandage, the shoe being designed to engage and slide along on the said plate which is located in the cotton batting part of the bandage and the shoe engaging plate having an arc-shaped thin metal member secured thereto and spaced therefrom to receive the shoe in the space.

2. A shoe for the purpose described, having a grooved upper surface and an attaching plate to which the shoe is attached which is formed with elongated openings for adjustably securing the shoe to a saw enclosing casing the end of the shoe and the lower corner of casing being located to prevent the teeth of the saw engaging an object when the casing is tilted forward.

3. A plaster cast cutting machine comprising an electric motor driven saw, an enclosing casing, for the saw, comprising oppositely located plates, a slotted spreader plate to which the enclosing plates are secured, a grooved shoe for receiving the lower edge of the saw, the shoe having a slotted arm which is located in the slot of the spreader plate, means in the spreader plate for entering the slots of said arm for securing the same to the spreader plate for varying the relative distance of the groove in the plate to the teeth of the saw.

4. A plaster cast cutting machine comprising an electric motor driven saw, an enclosing casing, for the saw, comprising oppositely located plates, a slotted spreader plate to which the enclosing plates are secured, a grooved shoe for receiving the lower edge of the saw, the shoe having a slotted arm which is located in the slot of the spreader plate, means in the spreader plate for entering the slots of said arm for securing the same to the spreader plate for varying the relative distance of the groove in the plate to the teeth of the saw, means secured to the opposite sides of the casing for manually supporting the machine when in use, one of the supporting means being tubular to permit air to enter the casing for discharging the refuse from the saw, the other supporting means having a trigger switch.

5. The method of forming and removing a plaster cast bandage which consists in placing on the outer surface of the cotton batting of the bandage a casing having a lower and upper metallic member that are secured together and spaced apart from each other to form a passageway, the gauze part of the cast being located over the upper metallic member of the casing, the upper metallic member being composed of thin material, then passing a shoe along on the lower plate and cutting the thin upper metallic member and the said gauze windings of the bandage, the shoe serving to support the saw and receive the teeth of the saw.

6. A plaster cast cutting machine having a motor driven saw a slotted spacing member, plates enclosing the upper part of the saw and secured in the slot of the spacer member, a grooved shoe adjustably secured to the spacer member and receiving the teeth of the saw, the shoe being so spaced from the lower edges of the plates as to prevent the teeth of the saw engaging an object when tipped forward, as shown and described.

7. A plaster cast cutting machine having a motor driven saw, a slotted spacing member, plates enclosing the upper part of the saw and securing means for the plate located in the slot of the spacer member, a grooved shoe adjustably secured to the spacer member and the groove receiving the teeth of the saw, the shoe being so spaced from the lower edges of the plates as to prevent the teeth of the saw engaging an object when tipped forward, the spacer member having slots in its opposite sides to permit the shoe to be reversed when the saw is reversed.

8. A machine for the purpose described, comprising in combination with a rotatable saw, an enclosing casing for the upper portion of the saw, a shoe having slots for adjustably securing the shoe to the casing and having a grooved part that is located below and close to the lower edge of the saw, and means comprising a handle which is located on the opposite sides of the casing which encloses the saw for guiding the machine when in use.

9. A machine for the purpose described, comprising in combination with a motor driven rotatable saw, an enclosing casing for a portion of the saw, a shoe having slots for adjustably securing the shoe to the enclosing casing and located below and close to the lower edge of the saw, and means comprising a handle which is located on the opposite sides of the casing which encloses the saw for guiding the machine, said shoe having a groove to receive the teeth of the saw, one of the handles being tubular for supplying air to the interior of the enclosing casing, and an electric switch in the other handle.

10. A machine for cutting a slit in a plaster cast comprising a rotatable saw, casing plates partially enclosing the saw, a grooved shoe secured to the casing plates and located below the saw for supporting the machine when in use, the groove being for receiving the teeth of the saw and the end of the shoe being located with reference to lower edge of the casing plates to prevent the teeth of the saw from engaging an object when the saw is tipped forward, as described.

11. An article of manufacture comprising a casing member for insertion in the cotton batting of a plaster cast bandage, said casing comprising two metal plates that are secured together at their edges, the upper plate being composed of thin metal which may be readily cut with a saw or other tool.

12. An article of manufacture comprising a casing member for the purpose described, comprising two members that are spaced from each other to form a passageway between the same, the passageway being designed to receive the supporting shoe of a device for cutting the plaster cast, a cutting element, the cutting element comprising a rotatable saw located above the shoe.

13. A plaster cast construction comprising the usual cotton batting and gauze layers and having a tubular member located on the cotton batting and below the inner layer of gauze, the tubular member permitting a tool to be inserted for cutting or severing the layers of gauze without the cutting tool engaging the cotton batting material, as described.

JEREMIAH J. McGRATH.